(12) United States Patent
Fujisawa

(10) Patent No.: US 7,874,321 B2
(45) Date of Patent: Jan. 25, 2011

(54) INDUSTRIAL TWO-LAYER FABRIC

(75) Inventor: Shigenobu Fujisawa, Shizuoka (JP)

(73) Assignee: Nippon Filcon Co., Ltd., Tokyo (JP)

( * ) Notice: Subject to any disclaimer, the term of this patent is extended or adjusted under 35 U.S.C. 154(b) by 0 days.

(21) Appl. No.: 12/591,712

(22) Filed: Nov. 30, 2009

(65) Prior Publication Data

US 2010/0132825 A1 Jun. 3, 2010

(30) Foreign Application Priority Data

Nov. 29, 2008 (JP) ............................. 2008-305742

(51) Int. Cl.
*D21F 7/08* (2006.01)
*D03D 3/04* (2006.01)
*D21F 1/10* (2006.01)

(52) U.S. Cl. .............................. 139/383 A; 139/383 R; 162/358.2

(58) Field of Classification Search ............. 139/383 R, 139/383 A, 383 AA, 408, 411, 412, 413, 139/414; 162/348, 358.1, 358.2, 900, 902, 162/903, 904
See application file for complete search history.

(56) References Cited

U.S. PATENT DOCUMENTS

| | | | | |
|---|---|---|---|---|
| 7,216,677 B2 * | 5/2007 | Fujisawa | ................. | 139/383 A |
| 7,270,151 B2 * | 9/2007 | Nagura et al. | ............. | 139/383 A |
| 7,306,014 B2 * | 12/2007 | Nagura et al. | ............. | 139/383 A |
| 7,343,938 B2 * | 3/2008 | Takimoto | ................. | 139/383 A |
| 7,357,156 B2 * | 4/2008 | Ueda et al. | ............... | 139/383 A |
| 7,357,157 B2 * | 4/2008 | Ueda | ....................... | 139/383 A |
| 7,412,991 B2 * | 8/2008 | Takimoto et al. | ......... | 139/383 A |
| 7,426,943 B2 * | 9/2008 | Ueda et al. | ............... | 139/383 A |
| 7,464,731 B2 * | 12/2008 | Fujisawa | ................. | 139/383 A |
| 2003/0084952 A1 * | 5/2003 | Burazin et al. | ........... | 139/383 A |
| 2006/0048838 A1 * | 3/2006 | Takimoto | ................. | 139/383 A |
| 2006/0048839 A1 * | 3/2006 | Fujisawa | ................. | 139/383 A |
| 2006/0112999 A1 * | 6/2006 | Nagura et al. | ............. | 139/383 A |
| 2006/0116042 A1 * | 6/2006 | Nagura et al. | ................ | 442/205 |
| 2006/0260708 A1 * | 11/2006 | Ueda et al. | ............... | 139/383 A |
| 2006/0278295 A1 * | 12/2006 | Ueda et al. | ............... | 139/383 A |
| 2007/0095417 A1 * | 5/2007 | Fujisawa | ................. | 139/383 A |

FOREIGN PATENT DOCUMENTS

| | | |
|---|---|---|
| JP | 2001-355191 A | 12/2001 |
| JP | 2006-057217 A | 3/2006 |
| JP | 2006-152462 A | 6/2006 |

* cited by examiner

*Primary Examiner*—Bobby H Muromoto, Jr.
(74) *Attorney, Agent, or Firm*—Rader, Fishman & Grauer PLLC

(57) ABSTRACT

Each of lower side wefts of an industrial two-layer fabric passes over three successive lower side warps and then under the remaining two or more lower side warps thereby forming a lower side weft design including a lower-side-weft long crimp. The lower side layer of the fabric is formed by arranging lower side wefts adjacent to each other while repeatedly shifting the weft design according to one of the following shift patterns: shifting by three warps; shifting by four warps; shifting by five warps; shifting by one warp and then four warps; shifting by three warps and then four warps; shifting by two warps and then five warps; shifting by one warp and then six warps; and shifting by one warp, four warps, five warps, and then four warps. The lower-side-weft long crimp of the lower side layer has a rectangular shape.

4 Claims, 12 Drawing Sheets

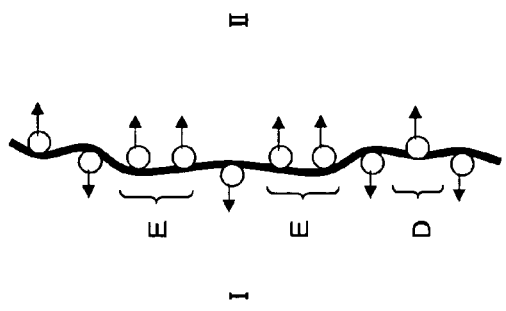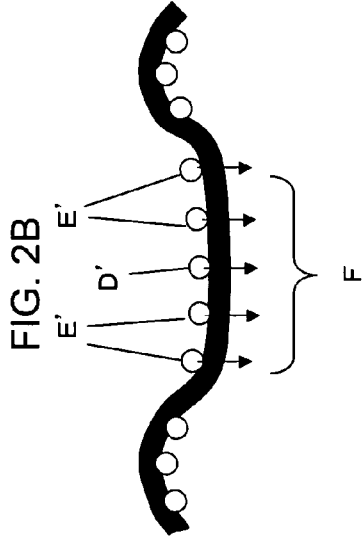
FIG. 2A  FIG. 2B
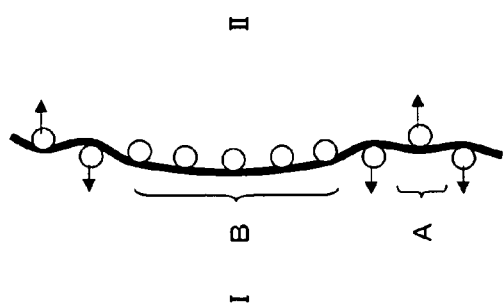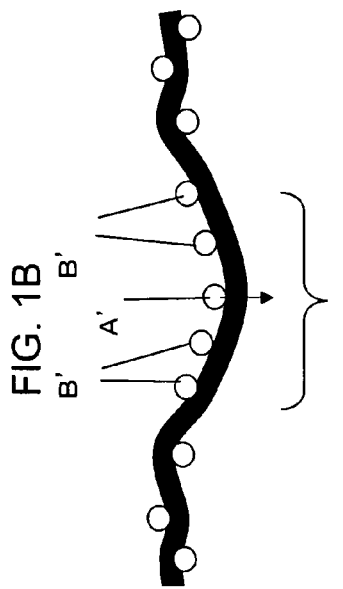
FIG. 1A  FIG. 1B
Prior Art

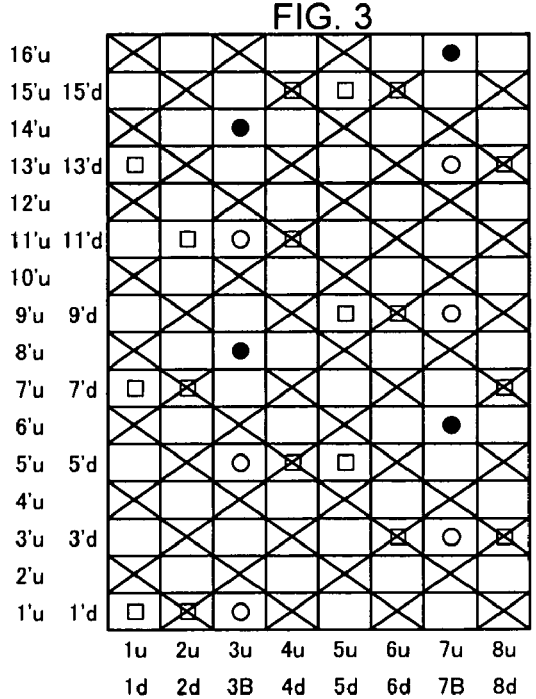
FIG. 3
FIG. 4A   FIG. 4B   FIG. 4C
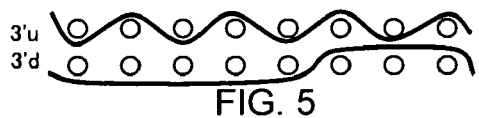
FIG. 5

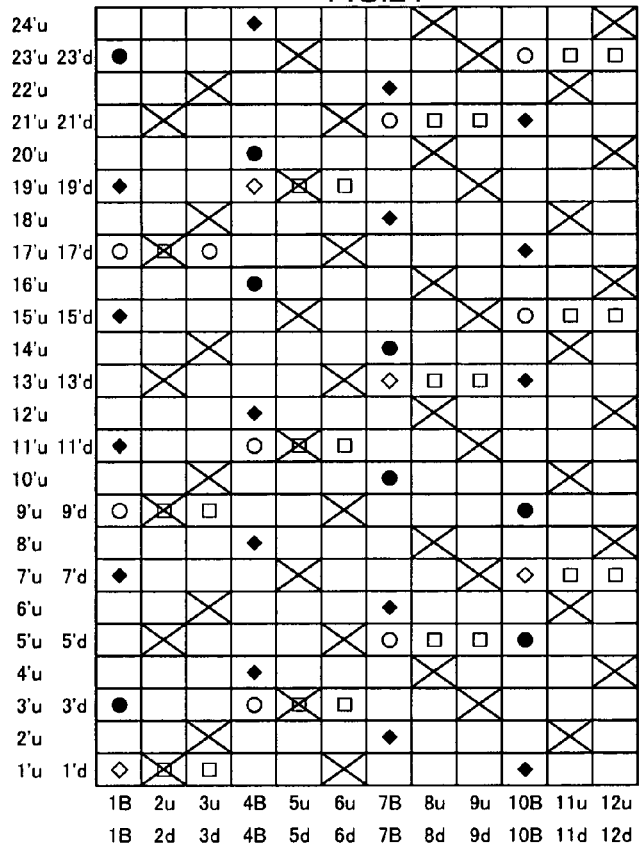
FIG.24
 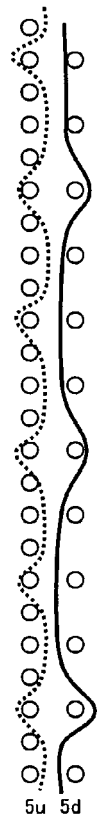 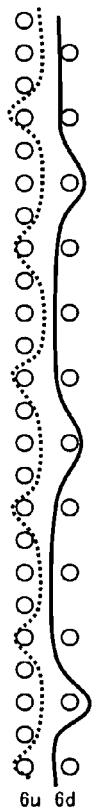
FIG.25A  FIG.25B  FIG.25C
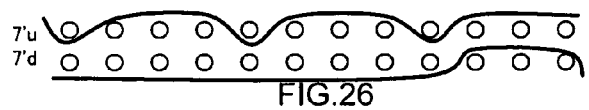
FIG.26

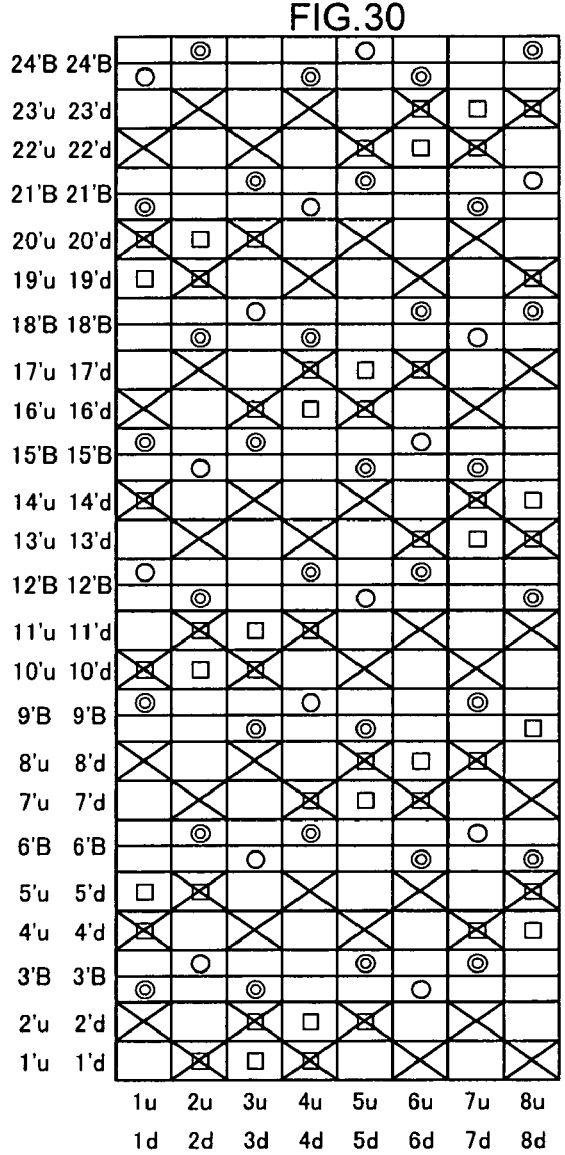
FIG.30
  
FIG.31A  FIG.31B  FIG.31C
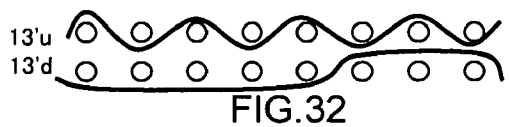
FIG.32

Prior Art
FIG. 33
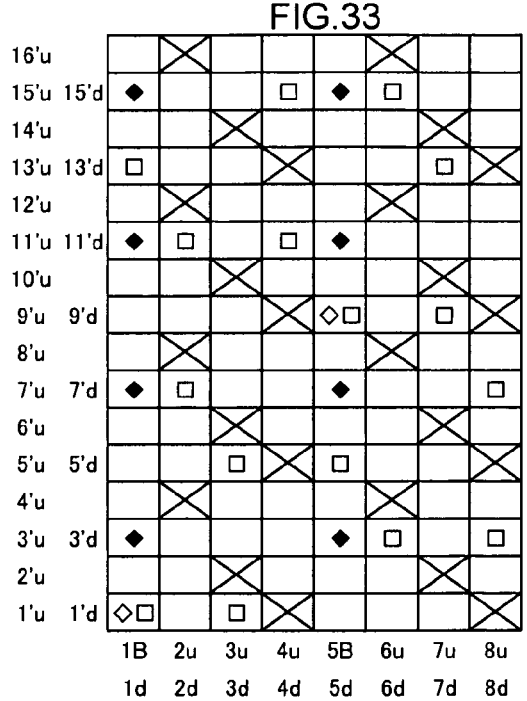
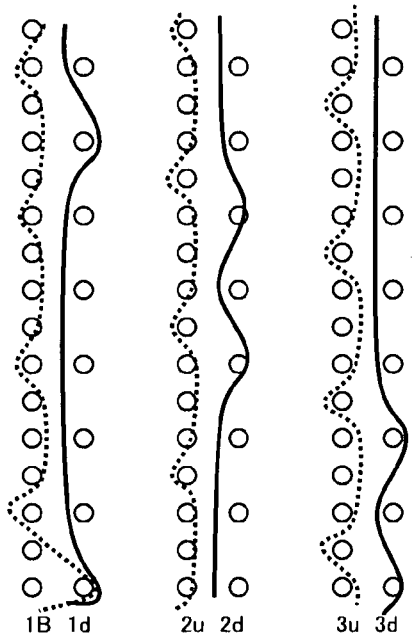
FIG.34A  FIG.34B  FIG.34C
Prior Art
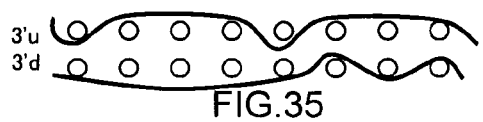
FIG.35
Prior Art

INDUSTRIAL TWO-LAYER FABRIC

CROSS-REFERENCES TO RELATED APPLICATION

This application claims priority from Japanese Patent Application Serial No. 2008-305742 filed Nov. 29, 2008, the contents of which are incorporated herein by reference in its entirety.

BACKGROUND OF THE INVENTION

1. Field of the Invention

The present invention relates to an industrial two-layer fabric, in particular, to an industrial two-layer fabric that is rigid, has water drainage properties, is wear resistance, has fiber supporting properties, has a papermaking yield, and high resiliency (lifespan).

2. Description of the Related Art

Fabrics made by weaving warps and wefts are used widely as industrial fabrics and in many other fields, for example, papermaking fabrics, conveying belts, and filter cloths, and these fabrics require fabric properties suited for those environments.

Requirements for papermaking fabrics used in a papermaking water removal step from raw materials by utilizing meshes of the fabrics are especially strict. For example, there is a demand for fabrics that do not easily transfer a wire mark of the fabrics to paper and are therefore superior in surface property, fabrics having a dehydration property to enable complete removal of excess water contained in the raw materials and being sufficiently rigid and wear resistant to enable suitable use of the fabric even under severe environments, and fabrics capable of retaining conditions necessary for making excellent paper for a long time period.

There is also a demand for fabrics having a fiber supporting property, capable of improving a papermaking yield, having size stability, having running stability, and the like. A higher demand for papermaking fabrics has developed from a recent increase in the speed of a papering machine.

Among industrial fabrics, papermaking fabrics must satisfy the most severe requirements so that a description of them will promote an understanding of these requirements and the solutions. Therefore, one example of the papermaking fabrics is described below.

In typical industrial fabrics, fabrics are traveled by joining the fabrics, which have been obtained by weaving to have ends, in an endless manner by the conventional method, suspending them in a plurality of rollers, and travelling the rollers while applying a tension thereto.

Since raw materials for making paper are supplied on the upper side layer of a papermaking fabric, the upper side layer is preferably dense, has a high supporting property, and has a surface smoothness. On the other hand, the lower side layer (the roller contact surface) is preferably excellent in wear resistance, rigidity, and has great water drainage properties. It is said that the upper side layer has preferably a design in which a predetermined pattern is repeated regularly, while the design of the lower side layer is still under investigation.

There are actually various designs proposed for the lower side layer. The fabric described in Japanese Patent Application Laid-Open No. 2006-152462 eliminates the defect of a ribbed weave design by forming a long crimp of lower side wefts and therefore has improved wear resistance. In this fabric, the float of lower side wefts can be made longer because although two adjacent warps have the same design as the ribbed weave design, they have each a design in which it passes under a lower side weft and then over a plurality of lower side wefts adjacent to each other.

However, this fabric also has a problem. Compared with the fabric of a ribbed weave design, this fabric has less weaving positions, which reduces its rigidity. In addition, wefts cannot be fixed firmly owing to a too long crimp of lower side wefts. As a result, the fabric's lifespan is not increased despite an increase in the wear volume of the wefts.

A fabric having improved rigidity is described in Japanese Patent Application Laid-Open No. 2006-57217. A lower side warp approaches the lower side warps adjacent to the right and left successively, and thus, are arranged in a zigzag manner so that the fabric has improved rigidity. But the undesirable movements of wefts cannot be prevented because the crimp is too long. Further, the fabric has undesirably increased in thickness.

A fabric having a crimp of an adequate length while maintaining rigidity is considered. The fabric has, as shown in FIG. 9 in Japanese Patent Application Laid-Open No. 2001-355191, an 8-shaft design in which a lower side weft passes over one lower side warp, under one lower side warp, over one lower side warp, and then under five successive lower side warps. When such a design is employed, the fabric has excellent rigidity because of an increase in weaving positions, is therefore firmly woven without undesirable movements of wefts, and has excellent wear resistance.

SUMMARY OF THE INVENTION

Lower side warps of this fabric, obtained by shifting the design of lower side wefts by three warps, may be designed in which the lower side warp passes under one lower side weft, over one lower side weft, and under one lower side weft so that the lower side weft over which the lower side warp passes is pushed to the reverse side of the fabric. As a result, wear of this portion precedes wear of the other portion. Owing to subsequent wear and breakage, the fabric becomes unsuited for practical use. In short, although the fabric can have an excellently rigid design and be free from undesirable movements of wefts, it does not have sufficient wear resistance due to occurrence of partial uneven wear. In addition, the fabric is not suited for use because the wire thickness increases due to a partial protrusion and adversely affects the water drainage and dehydration properties.

An object of the present invention is to provide an industrial two-layer fabric having a thin wire thickness, freedom from partial uneven wear, excellent rigidity, and excellent water draining and fiber supporting properties by using a lower side weft design having rigidity and wear resistance.

In the present invention, there are provided:

an industrial two-layer fabric having an upper side layer formed by weaving upper side warps with upper side wefts and a lower side layer formed by weaving lower side warps with lower side wefts, the upper side layer and the lower side layer being bound with binding yarns, wherein:

the lower side wefts each has a design in which the lower side weft passes over three successive lower side warps and then passes under the remaining two or more lower side warps to form a lower-side-weft long crimp;

a complete design in the lower side layer is formed by arranging the lower side wefts adjacent to each other while repeatedly shifting the above design in accordance with one of the shifting patterns selected from: (1) shifting by three warps; (2) shifting by four warps, shifting by five warps; (3) shifting by one warp and then four warps; (4) shifting by three warps and then four warps; (5) shifting by two warps and then five warps; (6) shifting by one warp and then six warps; and (7) shifting by one warp, four warps, five warps, and then four warps. and The lower-side-weft long crimp formed in the lower side layer has a rectangular crimp shape.

The term "complete design" as used herein means a minimum repeating unit of a weave pattern (which may also be called "design diagram").

The lower side warps each may form a design in which the lower side warp passes under one or more lower side wefts, passes over a plurality of lower side wefts to form a float in the warp direction, and passes under one or more lower side wefts.

The number of lower side wefts that determines the length of the float in the warp direction may be smaller than the number of warps that determines the length of the lower-side-weft long crimp.

The binding yarn for binding the upper side layer with the lower side layer may be any one of a single warp binding yarn, a pair of warp binding yarns, a single weft binding yarn, and a pair of weft binding yarns.

The industrial fabric according to the present invention has a thin wire thickness, excellent rigidness and wear resistance, freedom from partial uneven wear, and excellent water drainage and fiber supporting properties.

BRIEF DESCRIPTION OF THE DRAWINGS

FIGS. 1A and 1B are cross-sectional views of a warp and a weft of the conventional art, respectively, in which the weaving portion of the warp and weft and the shape of a weft long crimp are illustrated;

FIGS. 2A and 2B are cross-sectional views of a warp and a weft of the fabric of the present invention, respectively, in which the weaving portion of the warp and weft and the shape of a weft long crimp are illustrated;

FIG. 3 is a design diagram of an industrial two-layer fabric according to Embodiment 1 of the present invention;

FIGS. 4A-4C are cross-sectional views of the design diagram of FIG. 3 taken along Warp pairs 1, 2 and 3 respectively;

FIG. 5 is a cross-sectional view of the design diagram of FIG. 3 taken along Weft 3';

FIG. 24 is a design diagram of an industrial two-layer fabric according to Embodiment 8 of the present invention;

FIGS. 25A-25C are cross-sectional views of the design diagram of FIG. 24 taken along warp pairs 4, 5 and 6;

FIG. 26 is a cross-sectional view of the design diagram of FIG. 24 taken along Weft 7';

FIG. 30 is a design diagram of an industrial two-layer fabric according to Embodiment 10 of the present invention;

FIGS. 31A-31C are cross-sectional view of the design diagram of FIG. 30 taken along Warp pairs 1, 2 and 3 respectively;

FIG. 32 is a cross-sectional view of the design diagram of FIG. 30 taken along Weft 13';

FIG. 33 is a design diagram of an industrial two-layer fabric according to Conventional Example 1;

FIGS. 34A-34C are cross-sectional views of the design diagram of FIG. 33 taken along Warp pairs 1, 2 and 3; and FIG. 35 is a cross-sectional view of the design diagram of FIG. 33 taken along Weft 3'.

Figure 6:
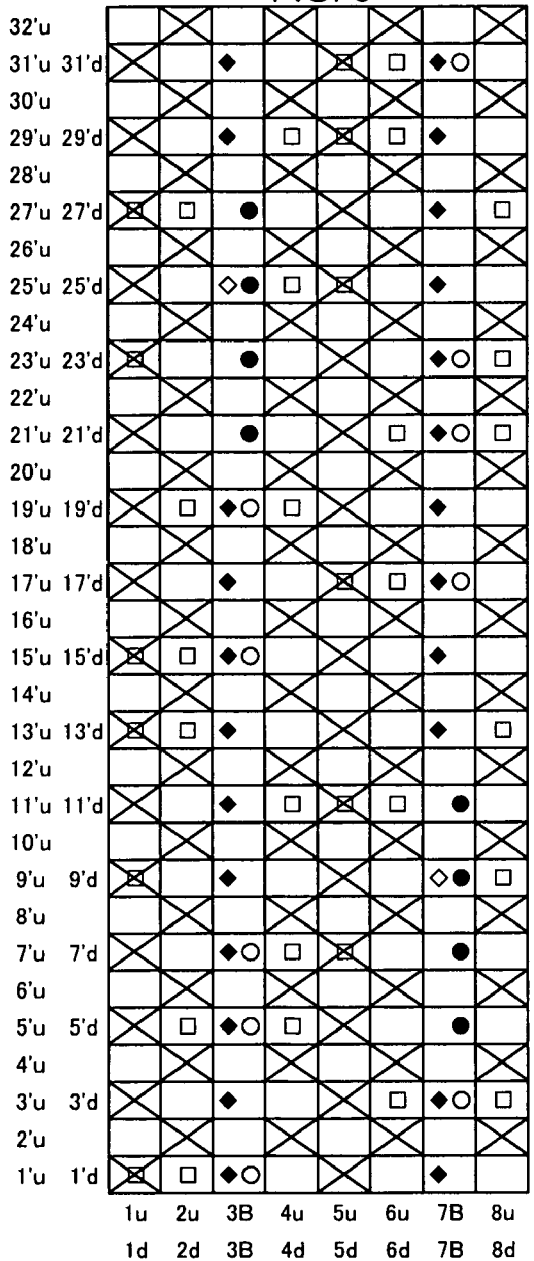
FIG. 6 is a design diagram of an industrial two-layer fabric according to Embodiment 2 of the present invention.

DESCRIPTION OF REFERENCE NUMERALS AND SIGNS u upper side warp, upper side weft
d lower side warp, lower side weft
B warp binding yarn, weft binding yarn

DESCRIPTION OF THE PREFERRED EMBODIMENTS

The present invention provides an industrial two-layer fabric having an upper side layer formed by weaving upper side warps with upper side wefts and a lower side layer formed by weaving lower side warps with lower side wefts, the upper side layer and the lower side layer being bound with binding yarns, wherein each of the lower side wefts passes over three successive lower side warps and then passes under the remaining two or more lower side warps thereby forming a long crimp on the surface of the lower side layer.

In addition, the long crimp of the lower side weft has a rectangular shape. In order to form such a structure, the lower side wefts arranged adjacent to each other form a complete design by repeatedly shifting their design in accordance with any one of the following eight shifting patterns:

(1) Shifting only by three warps.
(2) Shifting only by four warps.
(3) Shifting only by five warps.
(4) Shifting by one warp and then four warps.
(5) Shifting by three warps and then four warps.
(6) Shifting by two warps and then five warps.
(7) Shifting by one warp and then six warps.
(8) Shifting by one warp, four warps, five warps and then four warps.

Based on discovery that an undesirable movement or shifting of wefts is caused not only by the length of a crimp, but also other factors, the present inventors created a design free of undesirable movements even when a weft crimp is long. According to this constitution, even a multi-shaft fabric can produce a comparable effect.

Of the conventional art designs having excellent wear resistance while maintaining rigidity, there is a lower side layer design in which a lower side warp passes under a lower side weft, passes over a lower side weft, and then passes under a lower side weft, while a lower side weft passes over a lower side warp, passes under a lower side warp, passes over a lower side warp, and then passes under the remaining two or more lower side warps to form a crimp. In this design, a weft long crimp is formed on the lower surface side so that the resulting industrial fabric has excellent wear resistance. Further, due to strong weaving force of both warps and wefts, the resulting fabric has improved rigidity, less undesirable weft movements, and reduced wire thickness.

In the design of the lower side warp in which it passes under one lower side weft, passes over one lower side weft, and then passes under one lower side weft, a lower side weft is lifted up at a portion where the lower side warp passes under the corresponding lower side weft, while a force pushing down a lower side weft is generated at a portion where the lower side warp passes over the corresponding lower side weft. In particular, at a portion where the lower side warp passes under, over, and then under three lower side wefts, respectively, the lower side wefts of the weaving portion are lifted up on both sides, by which the lower side weft at the center of the three lower side wefts tends to be pushed down.

The portion pushed down corresponds to only a portion of the lower-side-weft long crimp (particularly, at the center of the long crimp) so that the present inventors have invented a fabric design capable of preventing this partial protrusion caused by a high concentration of a pushing force and therefore suited for use for a long period of time.

In the conventional art, there is an example of a lower side weft design in which it passes over one lower side warp, passes under one lower side warp, passes over one lower side warp, and then passes under the remaining two or more lower side warps and a complete design of the lower side layer is formed by arranging lower side wefts adjacent to each other while shifting the above design by five warps. Accordingly, the lower side warps each form a design in which they pass under one lower side weft, over one lower side weft, under one lower side weft, and then over the remaining two or more lower side wefts.

This means that lower side wefts form, under the lower side layer (on the machine contact side), a weft long crimp corresponding to the number of the lower side wefts passing under lower side warps and at the same time, lower side warps form, over the lower side layer (on the contact side with the upper side layer), a float in a warp direction corresponding to the number of the warps passing over lower side wefts. In the design of the conventional art, the number of warps determining the length of a lower-side-weft long crimp and the number of wefts determining the length of the float of lower side warps are equal. The present inventors have found through comparison of various fabrics that the above fact adversely affects the crimp shape of wefts.

The term "lower-side-weft crimp" as used herein means a protrusion of wefts formed under the lower side layer (on the machine contact side) by lower side wefts passing under a plurality of warps (lower side warps and warp binding yarns). An increase in the length of this protrusion (formation of a long crimp) raises a wear volume of wefts, leading to improvement of wear resistance of a wire. The term "the number of warps determining the length of a lower-side-weft long crimp" means the number of warps under which lower side wefts pass when a protrusion of wefts is formed under (on the machine contact side) the lower side layer. For example, in a 10-shaft design in the conventional art, a weft long crimp corresponding to seven warps is formed so that the number of warps determining the length of a lower-side-weft crimp is seven.

The term "float of lower side warp" means a protrusion of lower side warps formed over the lower side layer (on the contact side with the upper side layer) by the warps passing over lower side wefts. A decrease in the length of this protrusion leads to an increase in a binding force of lower side wefts. The term "the number of lower side wefts determining the length of a float in a warp direction" means the number of wefts over which a lower side warp passes when a protrusion of warps is formed over the lower side layer (on the contact side with the upper side layer).

Lower side wefts of the present invention each have a design in which they pass over three lower side warps and then under the remaining two or more lower side warps to form a long crimp and a complete design in the lower side layer is formed by arranging lower side wefts adjacent to each other while repeatedly shifting the above design in accordance with a shifting pattern selected from the following shifting patterns: shifting by three warps, shifting by four warps, shifting by five warps, shifting by one warp and then four warps, shifting by three warps and then four warps, shifting by two warps and then five warps, shifting by one warp and then six warps, and shifting by one warp, four warps, five warps, and then four warps.

Accordingly, the lower side warps each has a design in which they pass under one or more lower side wefts, over one or more lower side wefts adjacent thereto, under one or more lower side wefts adjacent thereto, and over the remaining lower side wefts.

This design is similar to that of the conventional art, but the fabric of the present invention is different from that of the conventional art in the design of lower side wefts. With an increase in the number of the positions where lower side wefts are woven with lower side warps, the number of lower side wefts determining the length of a float of lower side warps decreases and the length of the float in a warp direction formed over the lower side layer decreases. In short, there exists a relationship between the number of lower side wefts determining the length of a float of lower side warps and the number of warps determining the length of a lower-side-weft long crimp and the former one is smaller than the latter one.

With a decrease in the length, in a warp direction, of a float formed by lower side warps, the lower side warps restrain lower side wefts with a higher restraining force. As a result, compared with the conventional art where a float in a warp direction is long, lower side warps of the present invention can push down lower side wefts with an increased pushing force.

Comparison in the structure, characteristics, and effects between the industrial fabrics obtained by the conventional art and the present invention will next be described referring to FIGS. 1 and 2. FIGS. 1A and 1B are cross-sectional views of a warp and a weft of the fabric according to the conventional art, while FIGS. 2A and 2B are cross-sectional views of a warp and a weft of the fabric according to the present invention.

In these drawings, the letter I means an upper side of the lower layer side (a contact side with the upper layer); the letter II means a lower side of the lower layer side (a machine contact side); and an arrow represents the pushing force of a warp against a weft and direction of the force.

In the conventional art, at a portion (A) where a lower side warp passes under a lower side weft, passes over a lower side weft, and then passes under a lower side weft, the lower side wefts at the weaving portion are lifted up, whereby Lower side weft 2 at the center of them tends to be pushed out to the lower side (in a direction of the arrow in the drawing). The portion thus pushed out is only a portion (A') of the lower-side-weft long crimp (especially at the center of the crimp). Lower side warps (B') other than those causing protrusion of a portion of the crimp at the center of the crimp do not have a sufficient binding force for pushing out the lower side wefts so that the pushing force on the lower-side-weft long crimp is focused exclusively on a portion of the long crimp, causing a partial protrusion (C).

The fabric of the present invention also has, at a portion (D) formed by a lower side warp passing under one lower side weft, passing over one lower side weft, and then passing under one lower side weft, a portion of the lower side weft pushed down at a center (D') of a long-side-weft long crimp. Since in FIG. 2, all the other warps (E') at the weft long crimp have a design of forming a short float corresponding to two wefts, the lower side warps push down lower side wefts (in a direction of the arrow in the drawing) similar to the warp at the center of the long crimp. Different from the conventional art showing a high concentration to a portion of the long crimp, a pushing force acts on the wefts totally.

This action achieves a long crimp having not a "dogleg shape" showing a partial protrusion but a "rectangular shape" and occurrence of uneven wear can therefore be prevented. The term "dogleg shape" of a long crimp means a partial protrusion structure caused by a highly concentrated force of warps to push out wefts in the lower side direction at a portion (a portion not only at the center of the crimp) of a weft long crimp. This is a shape liable to cause uneven wear. When the long crimp has a "rectangular shape", on the other hand, a force of warps to push out wefts in the lower side direction acts totally on a weft long crimp and causes entire protrusion of a long crimp. It is a structure capable of maximizing a wear volume and therefore achieving excellent wear resistance.

In some multi-shaft designs or depending on the shifting manner of lower side wefts, a lower side warp may have a design in which it passes under one or more lower side wefts, over any of one to four lower side wefts, and then under one or more lower side wefts. The pushing force of the warps is not influenced by the number of the center lower side wefts to be pushed out when the number is any of one to four and all the warps of the long crimp portion have a force of pushing out wefts.

Moreover, in the design of the present invention, a lower side weft passes over three lower side warps to firmly weave the lower side weft therein, which improves its rigidity, suppresses undesirable movements of yarns, increases the wire's thickness, and ensures easy water drainage.

For example, in an eight-shaft design, a lower side weft is firmly woven with three lower side warps so that a long crimp design corresponding to five warps is formed on the lower surface side, leading to an increase in wear volume and improvement in wear resistance. Three warps adjacent to each other firmly weave therein a lower side weft simultaneously, which enables improvement in wire rigidity, decrease in wire thickness, increase in wear volume, and prevention of undesirable movements of lower side wefts. In addition, since a weft long crimp corresponding to five warps is formed on the lower side surface, wear resistance can be improved. Thus, the partial protrusion of wefts and reduction in the lifetime of the product due to preceding wear, which are the problem of the conventional art, can be prevented.

In a multi-shaft fabric, for example, a fabric having a 10-shaft design, a long crimp design corresponding to seven warps is formed on the lower side so that the fabric has a design excellent in wear resistance. Three warps arranged adjacent to each other firmly weave therein a lower side weft simultaneously so that a fabric capable of reducing a wire thickness, having improved rigidity, and excellent in suppression of undesirable movements of lower side wefts can be obtained.

As a yarn for weaving and binding the upper side layer with the lower side layer, warp binding yarns or weft binding yarns may be used either singly or as a pair. In the case of a warp binding yarn, the upper side layer and the lower side layer are bound by using, as well as a warp pair composed of an upper side warp and a lower side warp constituting the upper side layer and the lower side layer, respectively, a pair of warp binding yarns, a pair of an upper side warp and a warp binding yarn, or a pair of a lower side warp and a warp binding yarn. A warp binding yarn may be arranged singly as the binding yarn in addition to the pair of an upper side warp and a lower side warp constituting the upper side layer and the lower side layer, respectively.

In the case of a weft binding yarn, it is only necessary to place a pair of weft binding yarns or a single weft binding yarn between an upper side weft and a lower side weft constituting the upper side layer and the lower side layer, respectively.

No particular limitation is imposed on the upper side fabric design and any plain weave, twill weave, irregular twill weave, or sateen weave may be selected as needed. Compete designs obtained from such a weave design are connected longitudinally and latitudinally to obtain a fabric excellent in oblique rigidity, running stability, and wear resistance. It may be an upper side layer complete design made of a plurality of warp complete designs. It is also possible to place between upper side wefts an auxiliary weft with a smaller diameter than that of the upper side wefts.

Yarns to be used in the present invention may be selected depending on the using purpose. Examples of them include, in addition to monofilaments, multifilaments, spun yarns, finished yarns subjected to crimping or bulking such as so-called textured yarn, bulky yarn and stretch yarn, and yarns obtained by intertwining them. As the cross-section of the yarn, not only circular form but also square or short form such as stellar form, or elliptical or hollow form can be used. The material of the yarn can be selected freely and usable examples of it include polyester, polyamide, polyphenylene sulfide, polyvinylidene fluoride, polypropylene, aramid, polyether ether ketone, polyethylene naphthalate, polytetrafluoroethylene, cotton, wool and metal. Of course, yarns obtained using copolymers or incorporating or mixing the above-described material with a substance selected depending on the intended purpose may be used.

It is usually preferred to use polyester monofilaments having rigid qualities and excellent size stability as yarns constituting a papermaking wire. As lower side wefts required to have wear resistance, those obtained by interweaving a polyester monofilament and a polyamide filament, for example, by arranging them alternately are preferred because the fabric using such a weft has improved wear resistance while maintaining its rigidness.

Although no particular limitation is imposed on the diameter of constituent yarns of a fabric, upper side warps and upper side wefts constituting the upper side layer have preferably a relatively small diameter in order to obtain a dense and flat fabric surface. Since the lower side surface which comes in contact with a machine or roller should be rigid and wear resistance the lower side wefts and lower side warps preferably have a relatively large diameter. The diameter may be selected in consideration of the fabric's purpose, environment, or an arrangement ratio of upper wefts to lower wefts.

The embodiments of the present invention are described below while referring to the accompanying drawings.

EMBODIMENTS

FIGS. 1A, 1B and 2A, 2B are, as described above, cross-sectional views of a fabric of the conventional art and the fabric of the present invention, respectively, and each includes a warp cross-sectional view showing a relationship in pushing force between warp and weft and a weft cross-sectional view showing a weft long crimp shape.

FIGS. 3 to 32 illustrate the embodiments of the present invention and are any of a design diagram, a cross-sectional view taken along a warp, and a cross-sectional view taken along a weft. FIG. 33 is a design diagram of a conventional example for comparison with the fabric of the present invention; FIGS. 34A-34C are cross-sectional views of FIG. 33 taken along Warps 1, 2, and 3 of FIG. 33 respectively; and FIG. 35 is a cross-sectional view taken along Weft 3' of FIG. 33.

A design diagram is a minimum repeating unit of a fabric design and corresponds to a complete design of a fabric. The design described in claims of the present invention corresponds to this design. A fabric product is formed by connecting this complete design longitudinally and latitudinally.

In the design diagram, warps are indicated by Arabic numerals, for example 1, 2 and 3. Warp binding yarns for weaving upper and lower wefts are indicated by Arabic numerals with B, upper side warps are indicated by Arabic numerals with u, and lower side warps are indicated by Arabic numerals with d. In the design diagram, warps with the same number form a pair. For example, an upper side warp u and a warp binding yarn B constitutes a pair of warp binding yarns and an upper side warp u and a lower side warp d constitute a pair of upper and lower warps.

Wefts are indicated by Arabic numerals with a prime, for example, 1', 2' and 3'. Upper side wefts and lower side wefts are arranged vertically but an upper side weft sometimes does not have a lower side weft thereunder, which depends on an arrangement ratio. Upper side wefts are indicated by Arabic numerals with "u" and lower side wefts are indicated by Arabic numerals with "d", for example 1'u, 2'd.

In these design diagrams, a mark "x" indicates that an upper side warp lies over an upper side weft; a mark "□" indicates that a lower side warp lies under a lower side weft. A mark "●" indicates that a warp binding yarn (B) lies over an upper side weft; a mark "○" indicates that the warp binding yarn lies under a lower side weft; a mark "◆" indicates that a warp binding yarn B lies over an upper side weft; and a mark "◇" indicates that a warp binding yarn (B) lies under a lower side weft. When the upper side layer and the lower side layer are bound with a weft binding yarn, a mark "⊙" means that a weft binding yarn lies over an upper side warp and a mark "○" indicates that the weft binding yarn lies under a lower side warp.

Upper side warps and lower side warps, and upper side wefts and lower side wefts are placed while being overlapped vertically. In the design diagrams, yarns are vertically overlapped precisely. They are however illustrated as such for convenience of drawing and misalignment sometimes occurs in the actual fabric.

Embodiment 1

FIG. 3 is a design diagram illustrating the complete design of Embodiment 1 of the present invention. FIGS. 4A-4C are cross-sectional views of the design diagram of FIG. 3 taken along Warp pairs 1, 2 and 3 respectively. FIG. 5 is a cross-sectional view of the design diagram of FIG. 3 taken along Wefts 3'. The complete design of this fabric is made of two warp binding pairs and six warp pairs and the warp binding pairs are each made of one warp binding yarn and an upper side warp.

In the upper side layer, a warp has a plain weave design in which it passes over one upper side weft and then passes under a lower side weft and upper side wefts and lower side wefts are arranged at a ratio of 2:1.

In the design diagram of FIG. 3, Warps 3 and 7 are warp binding pairs composed of a warp binding yarn and an upper side warp, while Warps 1, 2, 4, 5, 6, 8 are each a warp pair made of an upper side warp and a lower side warp. Lower side wefts constituting the lower side layer each has a design in which it passes under three successive lower side warps and then passes under five lower side warps. The complete design of the lower side layer is formed by arranging lower side wefts adjacent to each other while shifting the above design by five warps.

The lower side weft of the present invention is woven firmly with three successive warps so that it is possible to improve the rigidness of the wire, decrease the wire thickness, increase a wear volume, and effectively suppress undesirable movements of lower side wefts. In addition, a weft long crimp corresponding to five warps and formed on the lower side surface can improve wear resistance.

A large difference from the conventional example resides in that no uneven wear occurs because a lower side weft does not protrude from the reverse side of the fabric.

Comparison with Conventional Example 1 illustrated in FIGS. 33 to 35 will next be described. First, Lower side weft 3'd of Conventional Example 1 is taken as an example. Lower side weft 3'd has a design in which it passes over one Lower side warp 6d, passes under Lower side warp 7d, passes over Lower side warp 8d, and then passes under five successive Warps 1d, 2d, 3d, 4d, and 5d. At the same time, it forms a complete design of the lower side layer by arranging lower side wefts adjacent to each other while shifting the above design by five warps. Lower side warps, on the other hand, have a similar design. Lower side warp 3d has a design in which it passes under one Lower side weft 1'd, passes over Lower side weft 3'd, passes under Lower side weft 5'd, and passes over five successive Lower side wefts 7'd, 9'd, 11'd, 13'd, and 15'd.

With regards to a portion of Lower side warp 3d passing under one lower side wet, over one lower side weft, and then under one lower side weft, at a portion where Lower side warp 3d passes under one Lower side weft 1'd, Lower side warp 3d is woven with Lower side weft 1'd and a force acts to lift up Lower side weft 1'd. Similarly, at a portion where Lower side warp 3d passes under Lower side weft 5'd, Lower side warp 3*d* is woven with Lower side weft 5'*d* and a force acts to lift up Lower side weft 5'*d*. At a portion where Lower side warp 3*d* passes over Lower side weft 3'*d*, a force acts to push down Lower side weft 3*d'*. Only a portion (center in this design) of the long crimp of Lower side weft 3'*d* is pushed out so that the long crimp is partially pushed out. Other Warps 1*d*, 2*d*, 4*d*, and 5*d* at a long crimp portion of Lower side weft 3'*d* pass over five successive lower side wefts. For example, Lower side warp 2*d* forms a design in which it passes under Lower side weft 11'*d*, passes over five successive Lower side wefts 13'*d*, 15'*d*, 1'*d*, 3'*d*, and 5'*d* and passes under Lower side weft 7'*d*. Since a float of Lower side warp 2*d* in a warp direction corresponds to five wefts with the crimp of Lower side weft 3'*d* therebetween and is thus long so that there is no sufficient force to push down Lower side weft 3'*d*. A force of pushing the lower-side-weft long crimp is highly concentrated at a position of Lower side warp 3*d*, that is, the center of the long crimp, causing a partial protrusion in the lower side weft. The crimp therefore becomes a dogleg shape. Such a phenomenon occurs in all the lower side wefts except Lower side weft 3'*d*. For example, protrusion of Lower side weft 1'*d* occurs only at Lower side warp 6*d*.

The partially protruded portion of the lower side weft is worn first and cannot be used suitably for long hours. As a result, it is broken and is no longer usable.

In Embodiment 1, on the other hand, Lower side weft 3'*d*, which is taken as an example, has a design in which Lower side weft 3'*d* passes over three successive Warps 6*d*, 7B, and 8*d* and then passes under five successive Warps 1*d*, 2*d*, 3B, 4*d*, and 5*d* and constitutes a complete design of the lower side layer by arranging lower side wefts adjacent to each other while shifting the above design by five warps. With regard to lower side warps, on the other hand, due to an increase in the number of weaving portions with lower side wefts, the number of the lower side warps passing over lower side wefts decreases and a float formed over the lower side layer in the warp direction becomes short. Lower side warp 1*d* has a design in which it passes under Lower side weft 1'*d*, passes over Lower side wefts 3'*d* and 5*d'*, passes under Lower side weft 7'*d*, passes over Lower side wefts 9'*d* and 11'*d*, passes under Lower side weft 13'*d*, and then passes over Lower side weft 15'*d*. In this design, the length of a float in the warp direction corresponds to two lower side wefts at most. The length of the float is shorter than the length of the float in the warp direction in the conventional example, which corresponds to five lower side wefts. A decrease in the length of the float in the warp direction formed by lower side warps leads to an increase in the force of lower side warps to bind lower side wefts therewith. Compared with the conventional example in which the float in the warp direction is long, a pushing force of lower side warps exerted on lower side wefts increases in the fabric of the present invention.

There exists a relationship between the number of lower side wefts determining the length of the float of lower side warps and the number of warps determining the length of a lower-side-weft long crimp and the former one is smaller than the latter one.

Due to arrangement of a warp design having such a pushing force at a place other than the center of the weft long crimp, lower side warps can push down entirety of lower side wefts, making it possible to obtain a rectangular weft long crimp and to suppress uneven wear.

Lower side weft 3'*d* of Example 1, taken as an example, has a design in which Lower side weft 3'*d* passes over three successive Lower side warps 6*d*, 7B, and 8*d* and passes under five successive Warps 1*d*, 2*d*, 3B, 4*d*, and 5*d*. Warp 3B forms a design in which it passes under Lower side weft 1'*d*, over Lower side weft 3'*d*, and then under Lower side weft 5'*d*, suggesting that a force acts to push Lower side weft 3'*d* toward the lower surface side. By this force, Lower side weft 3'*d* is protruded. In addition, it has been found that in other Warps 1*d*, 2*d*, 4*d*, and 5*d* woven with Lower side weft 3'*d* to form a weft long crimp, a force also acts to push Lower side weft 3'*d* toward the lower surface side. For example, Lower side warp 2*d* has a design in which it passes under Lower side weft 1'*d*, over two successive Lower side wefts 3'*d* and 5'*d*, under Lower side weft 7'*d*, over Lower side weft 9'*d*, under Lower side weft 11'*d*, and then over Lower side wefts 13'*d* and 15'*d*. At a portion of this design where Lower side warp 2*d* passes under Lower side weft 1'*d*, over two successive Lower side wefts 3'*d* and 5'*d*, and under Lower side weft 7'*d*, the length of a float in the warp direction corresponds to two wefts, that is, Lower side wefts 3'*d* and 5'*d*. The length of a float in the warp direction is short so that this design has a force to push lower side wefts toward the lower surface side.

Similarly, in Lower side warps i*d*, 4*d*, and 5*d*, a force acts to push out Lower side weft 3'*d* toward the lower surface side. A weft long crimp of Lower side weft 3'*d* is pushed toward the lower surface side not in a concentrated manner but entirely. The crimp therefore becomes not a "dogleg" shape, meaning a local protrusion, but becomes a "rectangular" shape so that uneven wear can be prevented.

Due to the formation of the lower-side-weft long crimp, lower side wefts have good wear resistance. In addition, a pushing force acts on the entirety of lower side wefts at a long crimp so that the crimp has a rectangular shape and as a result, uneven wear can be prevented.

Moreover, the lower side weft of the fabric of the present invention is woven firmly with three successive warps so that it is possible to improve the wire's rigidity, decrease the wire thickness, and provide an excellent fabric having an increased wear volume and reduced undesirable movements of lower side wefts.

The fabric of this embodiment has, as the upper side design, a plain weave design in which an upper side weft passes over one upper side warp and then under one upper side warp so that it is excellent in rigidity, surface smoothness, and fiber supporting properties.

As a result, the fabric obtained in Embodiment 1 has excellent rigidity, wear resistance, surface smoothness, fiber supporting properties, water drainage properties, and less undesirable weft movements.

Embodiment 2

Figure 7A:
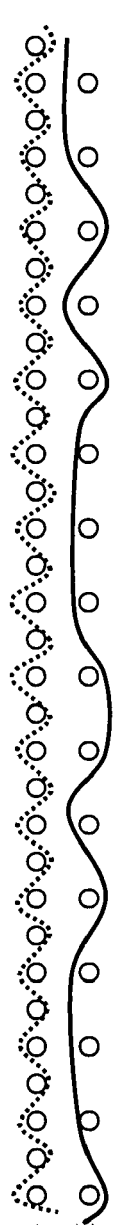
FIGS. 7A-7C are cross-sectional views of the design diagram of FIG. 6 taken along Warp pairs 1, 2 and 3 respectively.
Figure 7B:
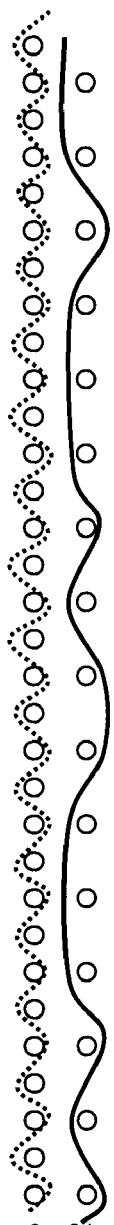
Figure 7C:
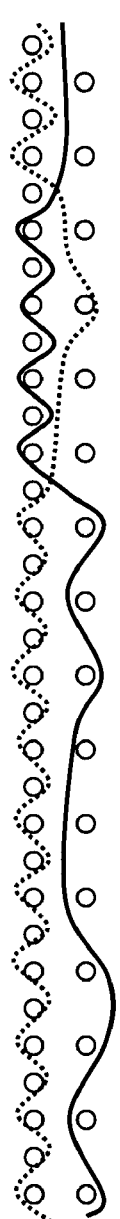
Figure 8:
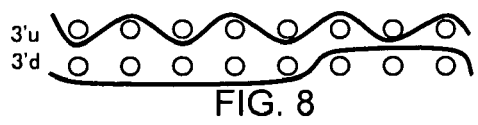
FIG. 8 is a cross-sectional view of the design diagram of FIG. 6 taken along Weft 3'.

FIG. 6 is a design diagram illustrating a complete design of Embodiment 2 of the fabric according to the present invention. FIG. 7 is a cross-sectional view of the design diagram of FIG. 6 taken along Warp pairs 1, 2, and 3 and FIG. 8 is a cross-sectional view of the design diagram of FIG. 6 taken along Weft 3'. The complete design of this fabric is made of two warp binding pairs and six warp pairs and the warp binding pair is made of two warp binding yarns.

The upper side layer of this fabric has a plain weave design in which a warp passes over one upper side weft and then under one upper side weft. An arrangement ratio of upper side wefts to lower side wefts is 2:1.

In the design diagram of FIG. 6, Warps 3 and 7 are binding yarn pairs made of two warp binding yarns and warps 1, 2, 4, 5, 6, and 8 are warp pairs made of an upper side warp and a lower side warp. Lower side wefts constituting the lower side layer have each a design in which they pass over three successive lower side warps and then under five lower side warps. A complete design of the lower side layer is formed by arranging lower side wefts adjacent to each other while shifting the above design by one warp, four warps, five warps, and then four warps, successively.

Lower side warps each forms a design in which they pass under one or more lower side wefts, over one or three lower side wefts to form a float in the warp direction, and then under one or more lower side wefts.

There exists a relationship between the number of lower side wefts determining the length of the float of lower side warps and the number of warps determining the length of a lower-side-weft long crimp and the former one is smaller than the latter one. As lower side warps restrain lower side wefts more firmly, the lower side wefts are pushed down more strongly. Moreover, a warp design having a pushing force is distributed over the weft long crimp so that the lower side warps push down the lower side wefts entirely. As a result, the weft long crimp has a rectangular crimp shape and uneven wear can be suppressed.

The fabric obtained in this embodiment has excellent wear resistance because of a weft long crimp corresponding to five warps, less uneven wear because of a rectangular crimp shape, an improvement of wire rigidness, and improve the suppression of undesirable movements of yarns because lower side wefts are woven firmly with three successive warps.

Embodiment 3

Figure 9:
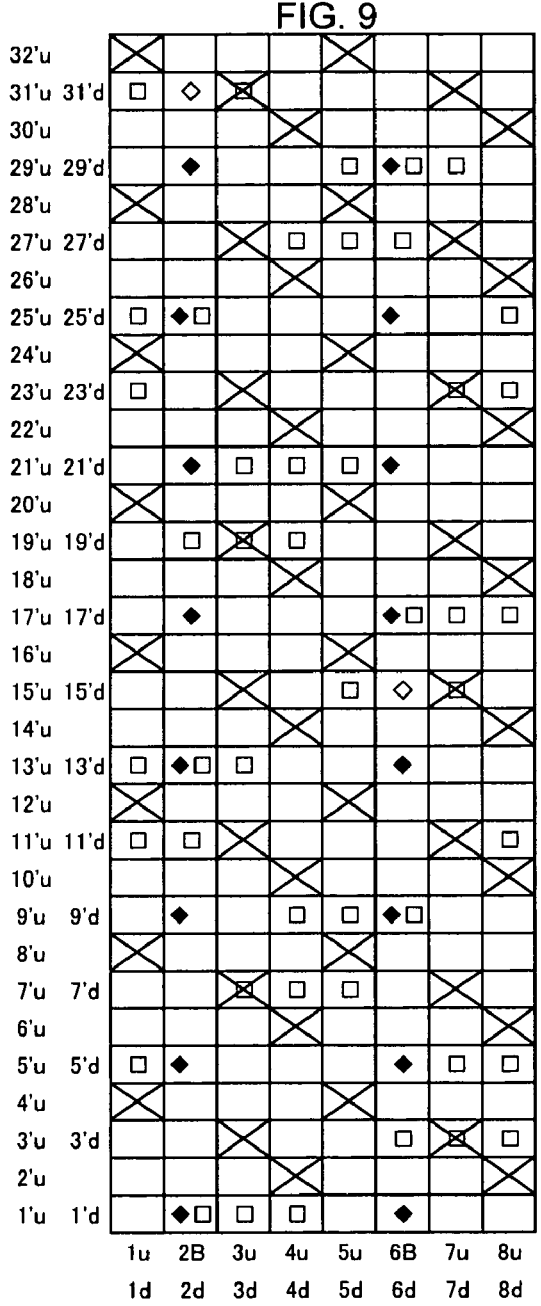
FIG. 9 is a design diagram of an industrial two-layer fabric according to Embodiment 3 of the present invention.
Figures 10A, 10B, 10C:
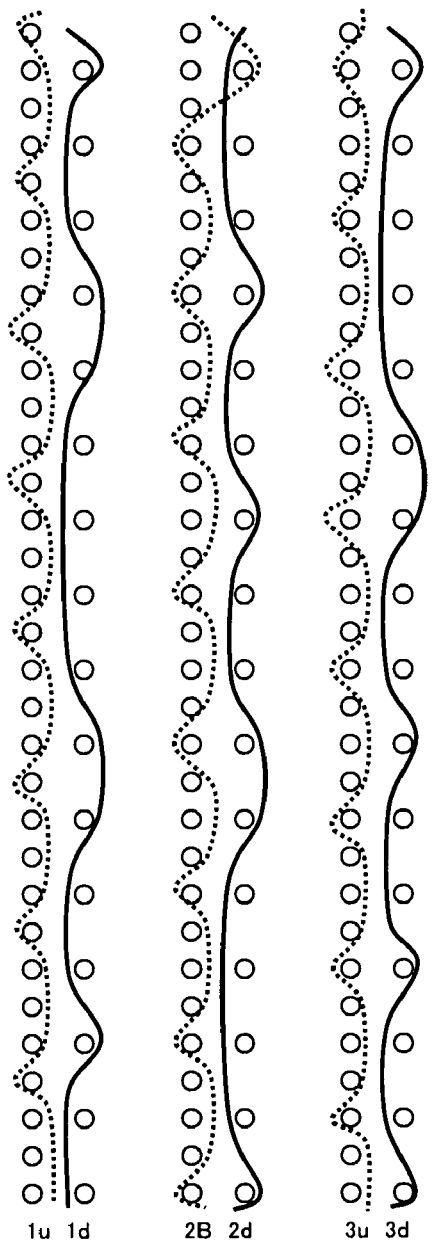
FIGS. 10A-10C are cross-sectional views of the design diagram of FIG. 9 taken along Warp pairs 1, 2 and 3 respectively.
Figure 11:
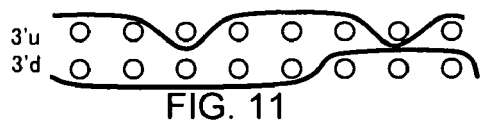
FIG. 11 is a cross-sectional view of the design diagram of FIG. 9 taken along Weft 3'.

FIG. 9 is a design diagram illustrating a complete design of Embodiment 3 of the fabric according to the present invention. FIGS. 10A-10C are a cross-sectional views of the design diagram of FIG. 9 taken along Warp pairs 1, 2, and 3 respectively, and FIG. 11 is a cross-sectional view of the design diagram of FIG. 9 taken along Weft 3'. The complete design of this fabric is made of two warp binding pairs and six warp pairs and the warp binding pair is made of a warp binding yarn and a lower side warp.

The upper side layer of this fabric has a sateen weave design obtained by irregularly shifting a ⅓ design in which a warp passes over one upper side weft and then under three upper side wefts. An arrangement ratio of upper side wefts to lower side wefts is 2:1.

In the design diagram of FIG. 9, Warps 2 and 6 are binding yarn pairs each composed of a warp binding yarn and a lower side warp and Warps 1, 3, 4, 5, 7, and 8 are warp pairs each made of an upper side warp and a lower side warp. Lower side wefts constituting the lower side layer have a design in which they pass over three successive lower side warps and then under five lower side wefts. The complete design of the lower side layer is formed by arranging lower side wefts adjacent to each other while shifting the above design by one warp and then by four warps. Lower side warps each constitute a design in which they pass under one or more lower side wefts, over two or four lower side wefts to form a float in the warp direction, and then under one or more lower side wefts.

There exists a relationship established between the number of lower side wefts determining the length of the float of lower side warps and the number of warps determining the length of a lower-side-weft long crimp and the former one is smaller than the latter one. As lower side warps restrain lower side wefts more firmly, the lower side wefts are pushed down more strongly. Moreover, a warp design having a pushing force is distributed over the weft long crimp so that the lower side warps push down the lower side wefts entirely. As a result, the weft long crimp has a rectangular crimp shape and uneven wear can be suppressed The fabric obtained in this embodiment has excellent wear resistance because of a weft long crimp corresponding to five warps, less uneven wear because of a rectangular crimp shape, an improvement of wire rigidness, and improve the suppression of undesirable movements of yarns because lower side wefts are woven firmly with three successive warps.

Embodiment 4

Figure 12:
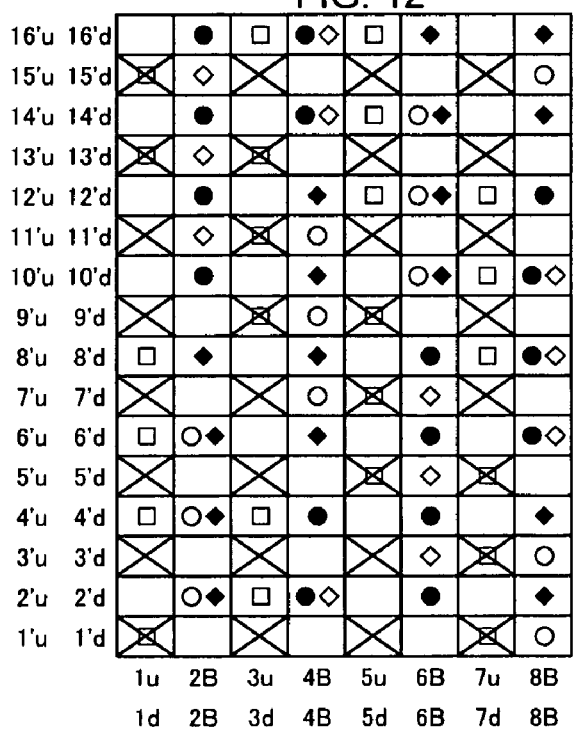
FIG. 12 is a design diagram of an industrial two-layer fabric according to Embodiment 4 of the present invention.
Figures 13A, 13B, 13C:
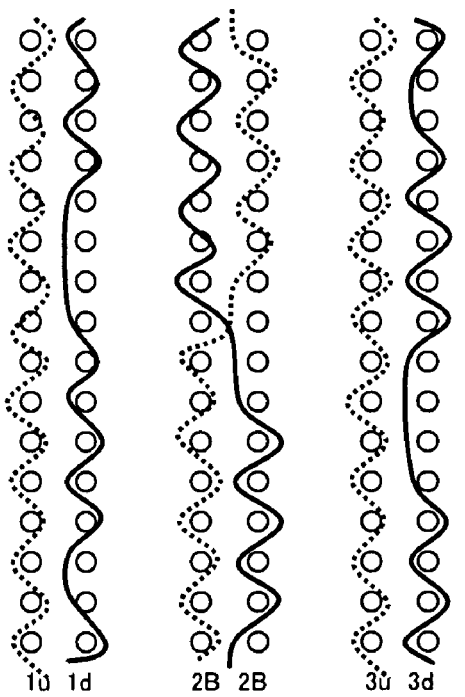
FIGS. 13A-13C are cross-sectional views of the design diagram of FIG. 12 taken along Warp pairs 1, 2 and 3 respectively.
Figure 14:
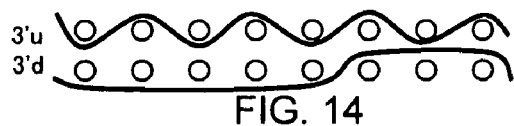
FIG. 14 is a cross-sectional view of the design diagram of FIG. 12 taken along Weft 3'.

FIG. 12 is a design diagram illustrating a complete design of Embodiment 4 of the fabric according to the present invention. FIGS. 13A-13C are cross-sectional views of the design diagram of FIG. 12 taken along Warp pairs 1, 2, and 3 respectively, and FIG. 14 is a cross-sectional view of the design diagram of FIG. 12 taken along Weft 3'. The complete design of this fabric is made of four warp binding pairs and four warp pairs and the warp binding pair is made of two warp binding yarns.

The upper side layer has a plain weave design in which a warp passes over one upper side weft and then under one upper side weft. An arrangement ratio of upper side wefts to lower side wefts is 1:1.

In the design diagram of FIG. 12, Warps 2, 4, 6 and 8 are binding yarn pairs each composed of two warp binding yarns and Warps 1, 3, 5, and 7 are warp pairs each made of an upper side warp and a lower side warp. Lower side wefts constituting the lower side layer each has a design in which they pass over three successive lower side warps and then under five lower side warps. The complete design of the lower side layer is formed by arranging lower side wefts adjacent to each other while shifting the above design by three warps and then by four warps. Lower side warps each constitute a design in which they pass under one or more lower side wefts, over one, two or four lower side wefts to form a float in the warp direction, and then under one or more lower side wefts.

There exists a relationship between the number of lower side wefts determining the length of the float of lower side warps and the number of warps determining the length of a lower-side-weft long crimp and the former one is smaller than the latter one. As lower side warps restrain lower side wefts more firmly, the lower side wefts are pushed down more strongly. Moreover, a warp design having a pushing force is distributed over the weft long crimp so that the lower side warps push down the lower side wefts entirely. As a result, the weft long crimp has a rectangular crimp shape and uneven wear can be suppressed.

The fabric obtained in this embodiment has excellent wear resistance because of a weft long crimp corresponding to five warps, less uneven wear because of a rectangular crimp shape, an improvement of wire rigidness, and improve the suppression of undesirable movements of yarns because lower side wefts are woven firmly with three successive warps.

Embodiment 5

Figure 15:
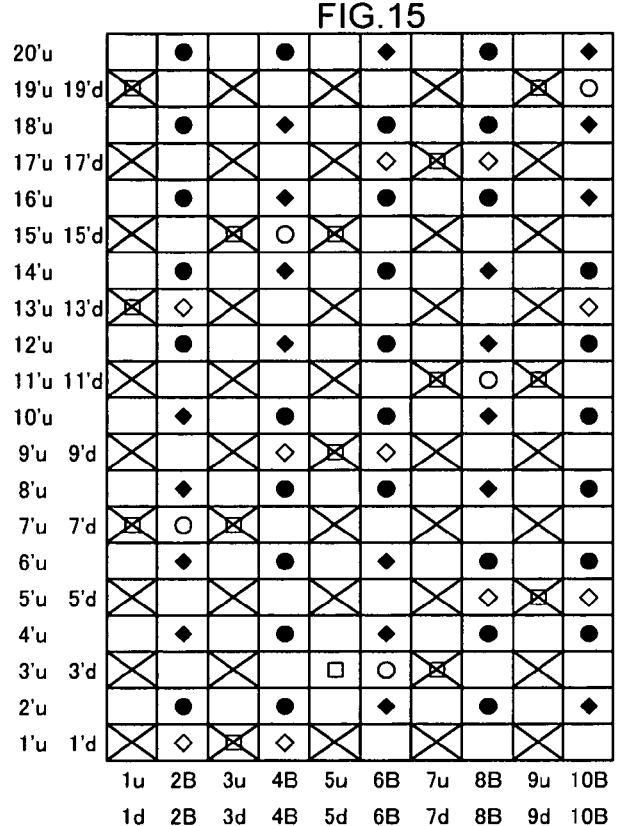
FIG. 15 is a design diagram of an industrial two-layer fabric according to Embodiment 5 of the present invention.
Figures 16A, 16B, 16C:
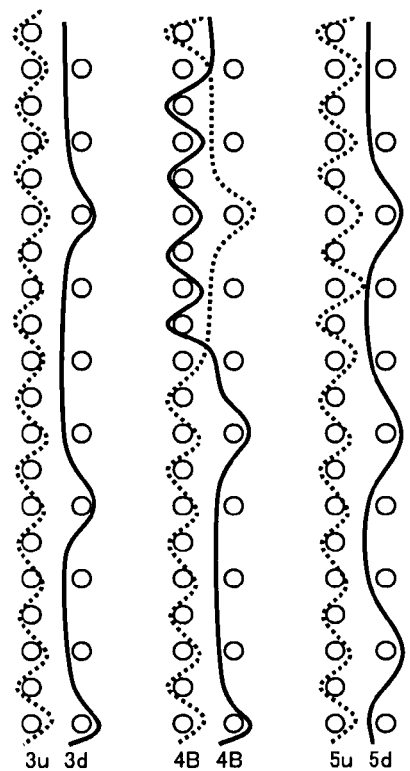
FIGS. 16A-16C are cross-sectional views of the design diagram of FIG. 15 taken along Warp pairs 3, 4 and 5 respectively.
Figure 17:
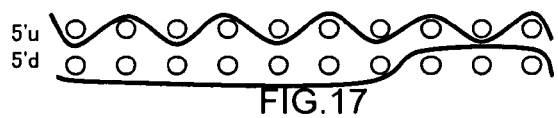
FIG. 17 is a cross-sectional view of the design diagram of FIG. 15 taken along Weft 5'.

FIG. 15 is a design diagram illustrating a complete design of Embodiment 5 of the fabric according to the present invention. FIGS. 16A-16C are cross-sectional views of the design diagram of FIG. 15 taken along Warp pairs 3, 4, and 5 respectively, and FIG. 17 is a cross-sectional view of the design diagram of FIG. 15 taken along Weft 5'. The complete design of this fabric is made of five warp binding pairs and five warp pairs and the warp binding pair is made of two warp binding yarns.

The upper side layer of this fabric has a plain weave design in which a warp passes over one upper side weft and then under one upper side weft. An arrangement ratio of upper side wefts to lower side wefts is 2:1.

In the design diagram of FIG. 15, Warps 2, 4, 6, 8 and 10 are binding yarn pairs each composed of two warp binding yarns and Warps 1, 3, 5, 7, and 9 are warp pairs each made of an upper side warp and a lower side warp. Thus, it is a 10-shaft fabric. Lower side wefts constituting the lower side layer have a design in which a lower side weft passes over three successive lower side warps and then under seven lower side warps. The complete design of the lower side layer is formed by arranging lower side wefts adjacent to each other while shifting the above design by three warps. Lower side warps each constitute a design in which they pass under one lower side weft, over two or three lower side wefts to form a float in the warp direction, and then under one lower side weft.

There exists a relationship between the number of lower side wefts determining the length of the float of lower side warps and the number of warps determining the length of a lower-side-weft long crimp and the former one is smaller than the latter one. As lower side warps restrain lower side wefts more firmly, the lower side wefts are pushed down more strongly. Moreover, a warp design having a pushing force is distributed over the weft long crimp so that the lower side warps push down the lower side wefts entirely. As a result, the weft long crimp has a rectangular crimp shape and uneven wear can be suppressed.

The fabric obtained in this embodiment has excellent wear resistance because of a weft long crimp corresponding to seven warps, less uneven wear because of a rectangular crimp shape, an improvement in wire rigidness, and improved the suppression of undesirable movements of yarns because lower side wefts are woven firmly with three successive warps.

Embodiment 6

Figure 18:
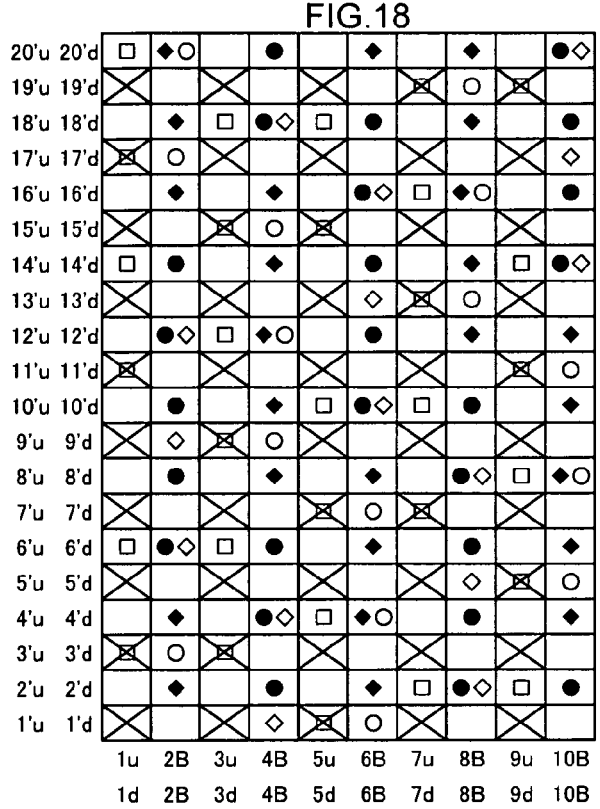
FIG. 18 is a design diagram of an industrial two-layer fabric according to Embodiment 6 of the present invention.
Figures 19A, 19B, 19C:
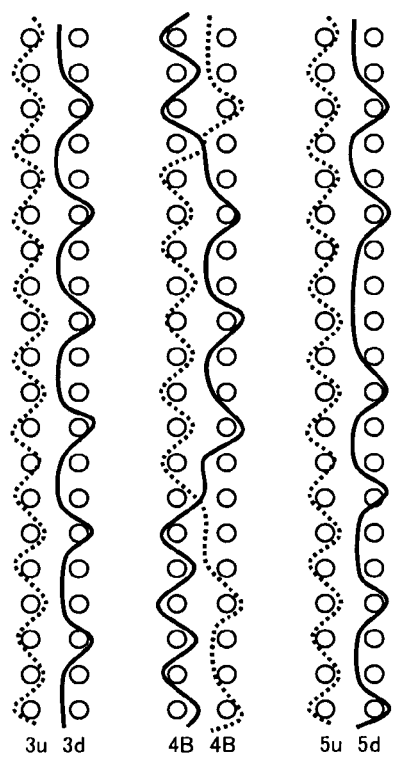
FIGS. 19A-19C are cross-sectional views of the design diagram of FIG. 18 taken along Warp pairs 3, 4 and 5 respectively.
Figure 20:
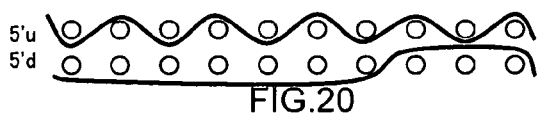
FIG. 20 is a cross-sectional view of the design diagram of FIG. 18 taken along Weft 5'.

FIG. 18 is a design diagram illustrating a complete design of Embodiment 6 of the fabric according to the present invention. FIGS. 19A-19C are cross-sectional views of the design diagram of FIG. 18 taken along Warp pairs 3, 4, and 5 respectively, and FIG. 20 is a cross-sectional view of the design diagram of FIG. 18 taken along Weft 5'. The complete design of this fabric is made of five warp binding pairs and five warp pairs and the warp binding pair is made of two warp binding yarns.

The upper side layer of this fabric has a plain weave design in which a warp passes over one upper side weft and then under one upper side weft. An arrangement ratio of upper side wefts to lower side wefts is 1:1.

In the design diagram of FIG. 18, Warps 2, 4, 6, 8, and 10 are binding yarn pairs each composed of two warp binding yarns and Warps 1, 3, 5, 7, and 9 are warp pairs each made of an upper side warp and a lower side warp. Thus, the fabric is a 10-shaft fabric. Lower side wefts constituting the lower side layer each have a design in which they pass over three successive lower side warps and then under seven lower side warps. The complete design of the lower side layer is formed by arranging lower side wefts adjacent to each other while shifting the above design by three warps and then four warps. Lower side warps each constitute a design in which they pass under one lower side weft, over two or four lower side wefts to form a float in the warp direction, and then under one lower side weft.

There exists a relationship between the number of lower side wefts determining the length of the float of lower side warps and the number of warps determining the length of a lower-side-weft long crimp and the former one is smaller than the latter one. As lower side warps restrain lower side wefts more firmly, the lower side wefts are pushed down more strongly. Moreover, a warp design having a pushing force is distributed over the weft long crimp so that the lower side warps push down the lower side wefts entirely. As a result, the weft long crimp has a rectangular shape and uneven wear can be suppressed.

The fabric obtained in this embodiment has excellent wear resistance because of a weft long crimp corresponding to seven warps, less uneven wear because of a rectangular crimp shape, an improvement in wire rigidness, and improved the suppression of undesirable movements of yarns because lower side wefts are woven firmly with three successive warps.

Embodiment 7

Figure 21:
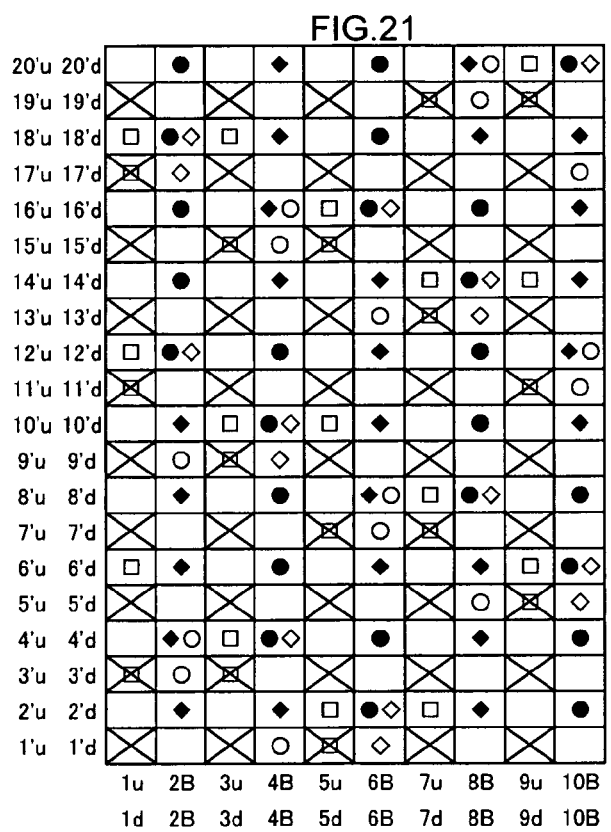
FIG. 21 is a design diagram of an industrial two-layer fabric according to Embodiment 7 of the present invention.
Figures 22A, 22B, 22C:
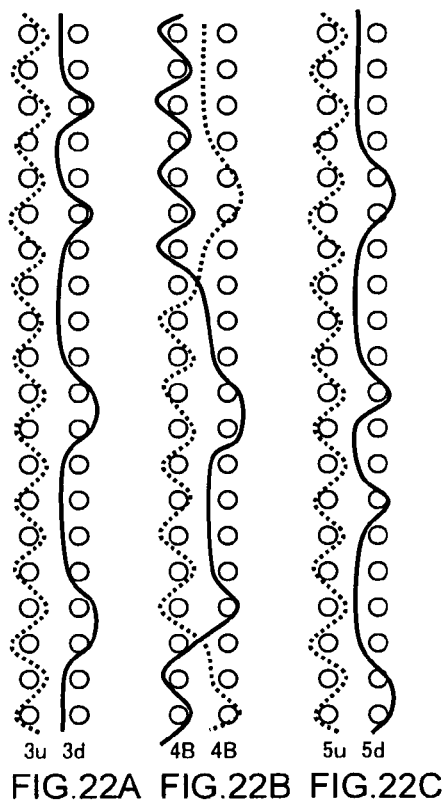
FIGS. 22A-22C are cross-sectional views of the design diagram of FIG. 21 taken along Warp pairs 3, 4 and 5 respectively.
Figure 23:
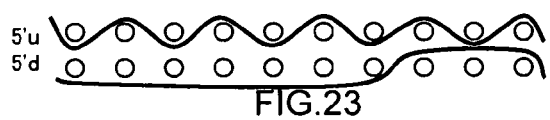
FIG. 23 is a cross-sectional view of the design diagram of FIG. 21 taken along Weft 5'.

FIG. 21 is a design diagram illustrating a complete design of Embodiment 7 of the fabric according to the present invention. FIGS. 22A-22C are cross-sectional views of the design diagram of FIG. 21 taken along Warp pairs 3, 4, and 5 respectively, and FIG. 23 is a cross-sectional view of the design diagram of FIG. 21 taken along Weft 5'. The complete design of this fabric is made of five warp binding pairs and five warp pairs and the warp binding pair is made of two warp binding yarns.

The upper side layer of this fabric has a plain weave design in which a warp passes over one upper side weft and then under one upper side weft. An arrangement ratio of upper side wefts to lower side wefts is 1:1.

In the design diagram of FIG. 21, Warps 2, 4, 6, 8, and 10 are binding yarn pairs each made of two warp binding yarns and warps 1, 3, 5, 7, and 9 are warp pairs each made of an upper side warp and a lower side warp. Thus, the fabric is a 10-shaft fabric. Lower side wefts constituting the lower side layer each have a design in which they pass over three successive lower side warps and then under seven lower side warps. The complete design of the lower side layer is formed by arranging lower side wefts adjacent to each other while shifting the above design by one warp and then six warps. Lower side warps each constitute a design in which they pass under one or more lower side wefts, over two or four lower side wefts to form a float in the warp direction, and then under one or more lower side wefts.

There exists a relationship between the number of lower side wefts determining the length of the float of lower side warps and the number of warps determining the length of a lower-side-weft long crimp and the former one is smaller than the latter one. As lower side warps restrain lower side wefts more firmly, the lower side wefts are pushed down more strongly. Moreover, a warp design having a pushing force is distributed over the weft long crimp so that the lower side warps push down the lower side wefts entirely. As a result, the weft long crimp has a rectangular shape and uneven wear can be suppressed.

The fabric obtained in this embodiment has excellent wear resistance because of a weft long crimp corresponding to seven warps, less uneven wear because of a rectangular crimp shape, an improvement in wire rigidness, and improve the suppression of undesirable movements of yarns because lower side wefts are woven firmly with three successive warps.

Embodiment 8

FIG. 24 is a design diagram illustrating a complete design of Embodiment 8 of the fabric according to the present invention. FIGS. 25A-25C are cross-sectional views of the design diagram of FIG. 24 taken along Warp pairs 4, 5 and 6 respectively, and FIG. 26 is a cross-sectional view of the design diagram of FIG. 24 taken along Weft 7'. The complete design of this fabric is made of four warp binding pairs and eight warp pairs and the warp binding pair is made of two warp binding yarns.

The upper side layer of this fabric has a sateen weave design obtained by irregularly shifting a ⅓ design in which a warp passes over one upper side weft and then under three upper side wefts. An arrangement ratio of upper side wefts to lower side wefts is 2:1.

In the design diagram of FIG. 24, Warps 1, 4, 7, and 10 are binding yarn pairs each made of two warp binding yarns and Warps 2, 3, 5, 6, 8, 9, 11, and 12 are warp pairs each made of an upper side warp and a lower side warp. Thus, the fabric is a 12-shaft fabric. Lower side wefts constituting the lower side layer each has a design in which it passes over three successive lower side warps and then passes under nine lower side warps. The complete design of the lower side layer is formed by arranging lower side wefts adjacent to each other while shifting the above design by three warps. Lower side warps each constitute a design in which they pass under one lower side weft, over three lower side wefts to form a float in the warp direction, and then under one lower side weft.

There exists a relationship between the number of lower side wefts determining the length of the float of lower side warps and the number of warps determining the length of a lower-side-weft long crimp and the former one is smaller than the latter one. As lower side warps restrain lower side wefts more firmly, the lower side wefts are pushed down more strongly. Moreover, a warp design having a pushing force is distributed over the weft long crimp so that the lower side warps push down the lower side wefts entirely. As a result, the weft long crimp has a rectangular shape and uneven wear can be suppressed.

The fabric obtained in this embodiment has excellent wear resistance because of a weft long crimp corresponding to nine warps, less uneven wear because of a rectangular crimp shape, an improvement in wire rigidity, and improved the suppression of undesirable movements of yarns because lower side wefts are woven firmly with three successive warps.

Embodiment 9

Figure 27:
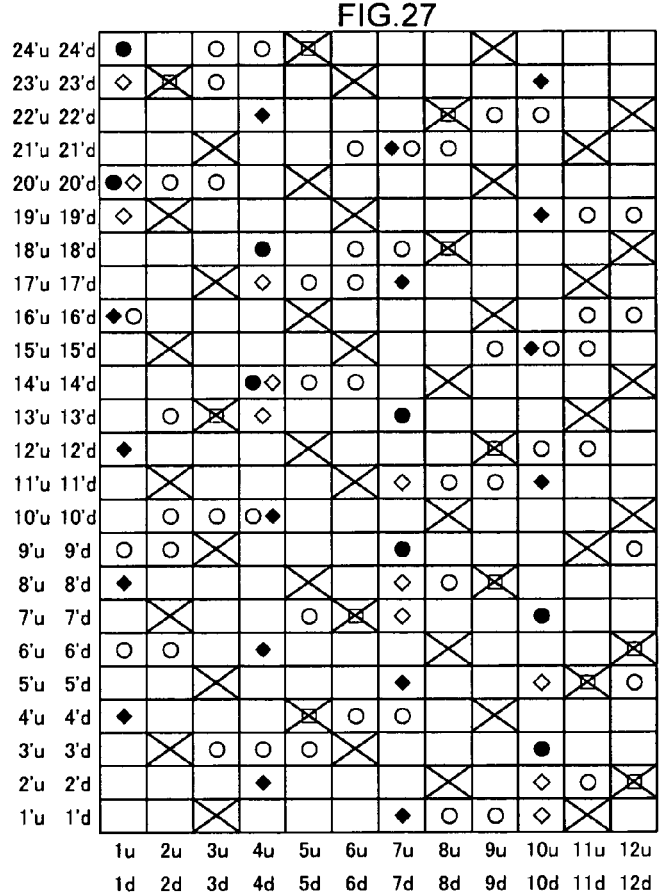
FIG. 27 is a design diagram of an industrial two-layer fabric according to Embodiment 9 of the present invention.
Figures 28A, 28B, 28C:
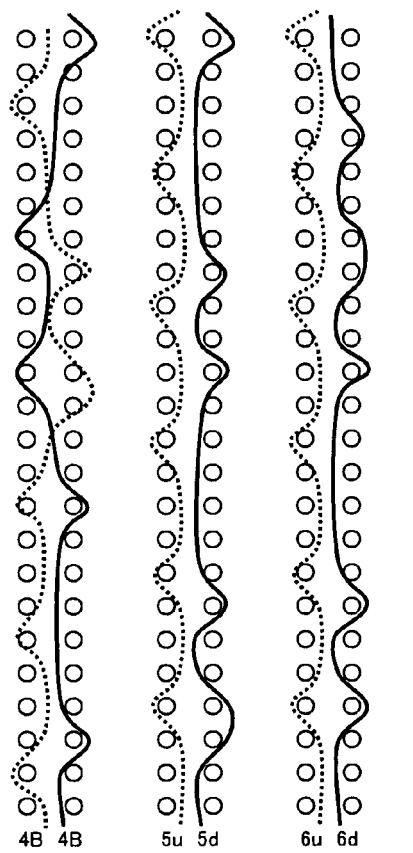
FIGS. 28A-28C are cross-sectional views of the design diagram of FIG. 27 taken along Warp pairs 4, 5 and 6 respectively.
Figure 29:
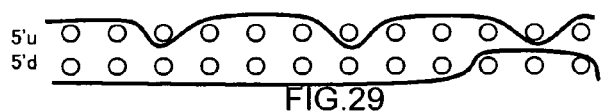
FIG. 29 is a cross-sectional view of the design diagram of FIG. 27 taken along Weft 5'.

FIG. 27 is a design diagram illustrating a complete design of Embodiment 8 of the fabric according to the present invention. FIGS. 28A-28C are cross-sectional views of the design diagram of FIG. 27 taken along Warp pairs 4, 5, and 6 respectively, and FIG. 29 is a cross-sectional view of the design diagram of FIG. 27 taken along Weft 5'. The complete design of this fabric is made of four warp binding pairs and eight warp pairs and the warp binding pair is made of two warp binding yarns.

The upper side layer of this fabric has a sateen weave design obtained by irregularly shifting a ⅓ design in which a warp passes over one upper side weft and then under three upper side wefts. An arrangement ratio of upper side wefts to lower side wefts is 1:1.

In the design diagram of FIG. 27, warps 1, 4, 7 and 10 are binding yarn pairs each made of two warp binding yarns and Warps 2, 3, 5, 6, 8, 9, 11 and 12 are warp pairs each made of an upper side warp and a lower side warp. Thus, the fabric is a 12-shaft fabric. Lower side wefts constituting the lower side layer each have a design in which they pass over three successive lower side warps and then under nine lower side warps. The complete design of the lower side layer is formed by arranging lower side wefts adjacent to each other while shifting the above design by two warps and then five warps. Lower side warps each constitute a design in which they pass under one or more lower side wefts, over two or six lower side wefts to form a float in the warp direction, and then under one or more lower side wefts.

There exists a relationship between the number of lower side wefts determining the length of the float of lower side warps and the number of warps determining the length of a lower-side-weft long crimp and the former one is smaller than the latter one. As lower side warps restrain lower side wefts more firmly, the lower side wefts are pushed down more strongly. Moreover, a warp design having a pushing force is distributed over the weft long crimp so that the lower side warps push down the lower side wefts entirely. As a result, the weft long crimp has a rectangular shape and uneven wear can be suppressed.

The fabric obtained in this embodiment has excellent wear resistance because of a weft long crimp corresponding to nine warps, less uneven wear because of a rectangular crimp shape, has an improvement in wire rigidity, and improved the suppression of undesirable movements of yarns because lower side wefts are woven firmly with three successive warps.

Embodiment 10

FIG. 30 is a design diagram illustrating a complete design of Embodiment 10 of the fabric according to the present invention. FIGS. 31A-31C are a cross-sectional views of the design diagram of FIG. 30 taken along Warp pairs 1, 2, and 3 respectively, and FIG. 32 is a cross-sectional view of the design diagram of FIG. 30 taken along Weft 13'. The upper and lower layers are woven with a warp binding yarn in the aforementioned embodiments, but those of the present fabric are woven with a pair of weft binding yarns. The weft binding yarns, as a pair, function as one weft on the upper side surface. The pairs of weft binding yarns are placed at intervals of two upper side wefts in the upper side layer. The upper side layer has a plain weave design made of a 1/1 design in which a warp passes over one upper side weft or a pair of weft binding yarns and then passes under one upper side weft or one weft binding yarn. A weft binding yarn has no lower side weft thereunder.

Lower side wefts constituting the lower side layer each have a design in which they pass over three successive lower side warps and then under five lower side warps. The complete design of the lower side layer is formed by arranging lower side wefts adjacent to each other while shifting the above design by one warp and then four warps. Lower side warps each constitute a design in which they pass under one or more lower side wefts, over two or four lower side wefts to form a float in the warp direction, and then under one or more lower side wefts.

There exists a relationship between the number of lower side wefts determining the length of the float of lower side warps and the number of warps determining the length of a lower-side-weft long crimp and the former one is smaller than the latter one. As lower side warps restrain lower side wefts more firmly, the lower side wefts are pushed down more strongly. Moreover, a warp design having a pushing force is distributed over the weft long crimp so that the lower side warps push down the lower side wefts entirely. As a result, the weft long crimp has a rectangular shape and uneven wear can be suppressed.

The fabric obtained in this embodiment has excellent wear resistance because of a weft long crimp corresponding to five warps, less uneven wear because of a rectangular crimp shape, an improvement in wire rigidness, and improve the suppression of undesirable movements of yarns because lower side wefts are woven firmly with three successive warps.

What is claimed is:

1. An industrial two-layer fabric comprising an upper side layer formed by weaving upper side warps with upper side wefts and a lower side layer formed by weaving lower side warps with lower side wefts, the upper side layer and the lower side layer being bound with binding yarns, wherein:
   each of the lower side wefts passes over three successive lower side warps and then passes under two or more lower side warps thereby forming a lower-side-weft design that includes a lower-side-weft long crimp;
   a complete design in the lower side layer is formed by arranging the lower side wefts adjacent to each other while repeatedly shifting the lower-side-weft design in accordance with one of the following shifting patterns:
   (1) shifting by three warps,
   (2) shifting by four warps,
   (3) shifting by five warps,
   (4) shifting by one warp and then four warps,
   (5) shifting by three warps and then four warps,
   (6) shifting by two warps and then five warps,
   (7) shifting by one warp and then six warps, and
   (8) shifting by one warp, four warps, five warps, and then four warps; and
   the lower-side-weft long crimp formed in the lower side layer has a rectangular shape.

2. The industrial two-layer fabric according to claim 1, wherein each of the lower side warps forms a design in which the lower side warp passes under one or more lower side wefts, passes over a plurality of lower side wefts thereby forming a float in the warp direction, and successively passes under one or more lower side wefts.

3. The industrial two-layer fabric according to claim 2, wherein the number of lower side wefts determining the length of the float in the warp direction is smaller than the number of warps determining the length of the lower-side-weft long crimp.

4. The industrial two-layer fabric according to any one of claim 1, wherein the binding yarns for binding the upper side layer with the lower side layer is a single warp binding yarn, a pair of warp binding yarns, a single weft binding yarn, or a pair of weft binding yarns.

* * * * *